(12) United States Patent
Shimamoto et al.

(10) Patent No.: US 10,972,616 B2
(45) Date of Patent: Apr. 6, 2021

(54) IMAGE PROCESSING SYSTEM

(71) Applicant: KYOCERA Document Solutions Inc., Osaka (JP)

(72) Inventors: Kunihiko Shimamoto, Osaka (JP); Shinichi Hashimoto, Osaka (JP); Akihiko Ikazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/703,523

(22) Filed: Dec. 4, 2019

(65) Prior Publication Data

US 2020/0186655 A1 Jun. 11, 2020

(30) Foreign Application Priority Data

Dec. 6, 2018 (JP) .............................. JP2018-229039

(51) Int. Cl.
*H04N 1/00* (2006.01)

(52) U.S. Cl.
CPC ..... *H04N 1/00127* (2013.01); *H04N 1/00952* (2013.01); *H04N 1/00954* (2013.01); *H04N 2201/0094* (2013.01)

(58) Field of Classification Search
CPC ........... H04N 1/00127; H04N 1/00954; H04N 1/00952; H04N 2201/0094
USPC ....................................................... 358/1.15
See application file for complete search history.

(56) References Cited

U.S. PATENT DOCUMENTS

| | | | | |
|---|---|---|---|---|
| 2007/0216943 A1* | 9/2007 | Funamizu | ............... | H04L 29/08 358/1.15 |
| 2009/0284791 A1* | 11/2009 | Osada | .................... | G06F 3/1261 358/1.15 |
| 2011/0157624 A1* | 6/2011 | Nishikawa | ......... | H04N 1/00053 358/1.15 |
| 2011/0228305 A1* | 9/2011 | Sasase | .................. | G06F 3/1221 358/1.13 |
| 2017/0206044 A1* | 7/2017 | Kim | ...................... | G06F 3/1242 |
| 2017/0214808 A1* | 7/2017 | Yun | ...................... | H04N 1/0022 |

FOREIGN PATENT DOCUMENTS

JP 2012182668 A 9/2012

* cited by examiner

*Primary Examiner* — Allen H Nguyen
(74) *Attorney, Agent, or Firm* — Studebaker & Brackett PC

(57) ABSTRACT

A reference device includes an operation section, a function collecting section, a function selection screen generating section, and a remote connection section. The function collecting section receives a function list from another device connected to a network. The function selection screen generating section generates a function selection screen including a function of the reference device and a function present only in the other device by comparing the function list received from the other device to a function list of the reference device and displays the function selection screen on the operation section. When the function present only in the other device is selected in the function selection screen, the remote connection section remotely connects the other device in which the selected function is present to the operation section of the reference device.

4 Claims, 5 Drawing Sheets

Sending function

File format

JPEG

TIFF

PDF

Searchable PDF

FIG. 2A

Sending function

Image correction

Background removal

Tilt correction

FIG. 2B

IMAGE PROCESSING SYSTEM

INCORPORATION BY REFERENCE

The present application claims priority under 35 U.S.C. § 119 to Japanese Patent Application No. 2018-229039, filed on Dec. 6, 2018. The contents of this application are incorporated herein by reference in their entirety.

BACKGROUND

The present disclosure relates to an image processing system which includes a plurality of image processing devices connected through a network.

A technique has been proposed for an image processing system including a plurality of image processing devices connected through a network. In the image processing system, processing requests are processed by the image processing devices in a distributed manner. The entire image processing system including the image processing devices connected through the network functions as a cooperative processing system. The cooperative processing system processes processing requests by a user from a personal computer (PC) in a distributed manner.

SUMMARY

An image processing system according to an aspect of the present disclosure includes an image processing device which is a reference device operated by an operator and an image processing device which is another device with a function not present in the reference device. The reference device and the other device are connected through a network. The reference device includes an operation section, a function collecting section, a function selection screen generating section, and a remote connection section. The operation section functions as a display section and an input section. The function collecting section sends a function list request to the other device connected to the network and receives a function list from the other device as a response. The function selection screen generating section generates a function selection screen including a function of the reference device and the function present only in the other device by comparing the function list received from the other device to a function list of the reference device and displays the function selection screen on the operation section. When the function present only in the other device is selected in the function selection screen, the remote connection section remotely connects the other device in which the selected function is present to the operation section of the reference device.

An image processing system according to another aspect of the present disclosure includes an image processing device which is a reference device operated by an operator and an image processing device which is another device with a function not present in the reference device. The reference device and the other device are connected through a network. The reference device includes an operation section, a function collecting section, a function selection screen generating section, and a reference device remote connection section. The operation section functions as a display section and an input section. The function collecting section sends a function list request to the other device connected to the network and receives a function list from the other device as a response. The function selection screen generating section generates a function selection screen including a function of the reference device and the function present only in the other device by comparing the function list received from the other device to a function list of the reference device and displays the function selection screen on the operation section. When a function which requires the operator to operate the other device is selected in the function selection screen, the reference device remote connection section sends various setting information of the reference device to the other device in which the selected function is present and remotely connects the other device to the operation section of the reference device. The other device includes an other device remote connection section. The other device remote connection section displays a movement message prompting operator movement to the other device in which the selected function is present on the operation section of the reference device and ends remote connection after the received various setting information of the reference device has been saved in storage of the other device.

BRIEF DESCRIPTION OF THE DRAWINGS

FIG. 2A is a diagram illustrating a display example of a function selection screen displayed by an operation section illustrated in FIG. 1. The function selection screen is for selecting a file format of image data read by a scan function.

FIG. 2B is a diagram illustrating a display example of a function selection screen displayed by the operation section illustrated in FIG. 1. The function selection screen is for selecting an image correction function when the scan function is performed.

DETAILED DESCRIPTION

The following describes an embodiment of the present disclosure in detail with reference to the accompanying drawings. In the following embodiment, elements indicating the same function are labeled with the same reference signs.

Figure 1:
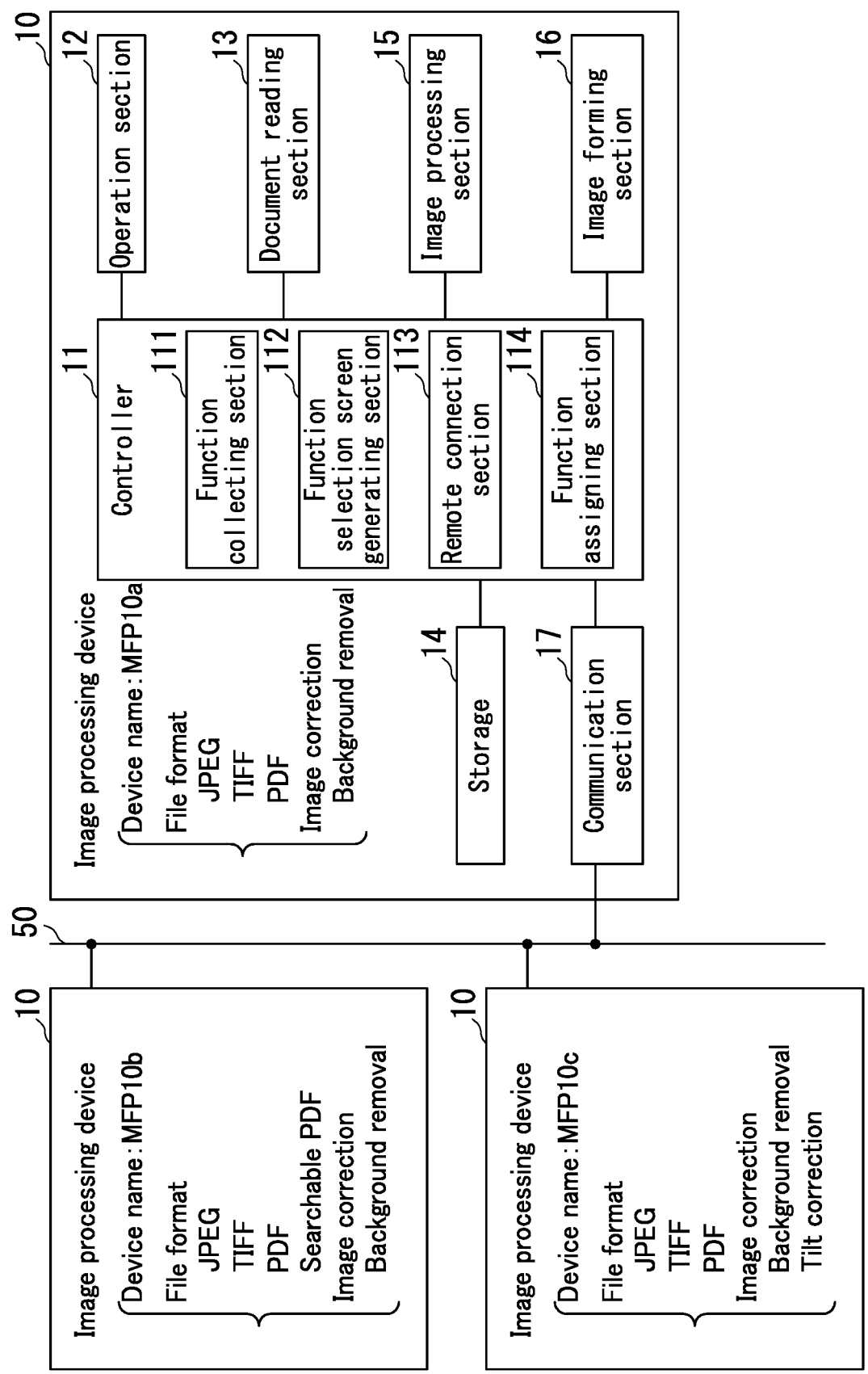
FIG. 1 is a block diagram illustrating a general configuration of an image processing system according to an embodiment of the present disclosure.

Referring to FIG. 1, an image processing system according to the present embodiment includes a plurality of image processing devices 10 connected through a network 50 such as a local area network (LAN) or the Internet.

The image processing devices 10 are copiers or multifunction peripherals with a plurality of functions including a scan function. Referring to FIG. 1, the image processing devices 10 each include a controller 11, an operation section 12, a document reading section 13, storage 14, an image processing section 15, an image forming section 16, and a communication section 17. In FIG. 1, an example is illustrated in which three image processing devices 10 are connected to the network 50. The three image processing devices 10 are respectively assigned different device names (MFP10a, MFP10b, and MFP10c).

Note that an image processing device 10 operated by an operator is referred to as a reference device, and the image processing devices 10 connected to the network 50 other than the reference device are referred to as other devices. In the following, MFP10a is described as the reference device, and the two devices MFP10b and MFP10c are described as other devices. Furthermore, an image processing device 10 with few functions is referred to as a low-function device, and an image processing device 10 with many functions is referred to as a high-function device. A low-function device is an old model or a low-cost model. A high-function device is a new model or a high-cost model.

MFP10a and MFP10c can select "JPEG", "TIFF", and "PDF" as a file format of an image read by the scan function. MFP10b can select "searchable PDF" in addition to "JPEG", "TIFF", and "PDF". Accordingly, MFP10a and MFP10c are low-function devices and MFP10b is a high-function device with regard to the file format of an image read by the scan function.

MFP10a and MFP10b can set "background removal" as an image correction function for an image read by the scan function, and MFP10c can set "tilt correction" as an image correction function in addition to "background removal". Accordingly, MFP10a and MFP10b are low-function devices and MFP10c is a high-function device with regard to the image correction function for an image read by the scan function.

The operation section 12 includes various operation keys including one or more of a touch panel, a numeric keypad, a reset key, a stop key, and a start key. The operation section 12 is a user interface which functions as a display section and an input section.

The document reading section 13 is a device which performs the scan function. The document reading section 13 is a scanner which irradiates a document with light and receives the light reflected from the document to read a document image. The document is fed by an unillustrated document feeder device or placed on a platen glass.

The storage 14 is a storage device such as semiconductor memory or a hard disk drive (HDD). The storage 14 stores therein either or both document data read by the document reading section 13 and document data received by the communication section 17.

The image processing section 15 performs prescribed image processing on the document data. The image processing section 15 performs image processing such as enlargement and reduction processing, density adjustment, and gradation adjustment.

The image forming section 16 prints an image through image formation on paper. The image is formed based on image data read by the document reading section 13, document data stored in the storage 14, or document data received by the communication section 17.

The communication section 17 has a function of sending and receiving various data between the reference device and the other devices over the network 50.

The controller 11 is an information processor such as a microcomputer including elements such as a central processing unit (CPU), read-only memory (ROM), and random-access memory (RAM). A control program for performing operation control of an image processing device 10 is stored in the ROM. The CPU of the controller 11 performs overall control of the image processing device 10 by reading out the control program stored in the ROM and loading the control program in the RAM. The controller 11 of each image processing device 10 functions as a function collecting section 111, a function selection screen generating section 112, a remote connection section 113, and a function assigning section 114.

The function collecting section 111 of the reference device sends a function list request to the other devices connected to the network 50 and receives function lists from the other devices as a response. Upon receiving a function list request from another device through the network 50, the function collecting section 111 sends a function list of the reference device to the other device as a response.

As illustrated in FIGS. 2A and 2B, the function selection screen generating section 112 of the reference device generates a function selection screen including the functions of the reference device and functions that are present only in the other devices by comparing the function lists received from the other devices to the function list of the reference device. The function selection screen generating section 112 then displays the generated function selection screen on the operation section 12. In the function selection screen, the functions present only in the other devices are displayed as distinguishable from the functions of the reference device. FIG. 2A illustrates a function selection screen for selecting the file format in MFP10a and MFP10b of image data read by the scan function. In the function selection screen, file formats of an image read by the scan function of the reference device are displayed, and "searchable PDF" which is a file format of a read image present only in MFP10b is additionally displayed in a distinguishable manner. Specifically, the color of text showing the file format of an image read by the scan function of the reference device differs from the color of text showing the file format of a read image present only in another device. FIG. 2B is a function selection screen for selecting an image correction function in MFP10a and MFP10b when the scan function is performed. In the function selection screen, the image correction function for an image read by the scan function of the reference device is displayed, and "tilt correction" which is an image correction function for an image read by the scan function present only in MFP10c is additionally displayed in a distinguishable manner. Specifically, the color of text showing the image correction function of the reference device differs from the color of text showing the image correction function present only in another device.

When a function present only in another device is selected in the function selection screen, the remote connection section 113 of the reference device remotely connects the other device in which the selected function is present to the operation section 12 of the reference device. As a result, the remote connection section 113 can operate the other device through the operation section 12 of the reference device.

In the performance of functions during the remote connection, the function assigning section 114 of the other device assigns functions to be performed by the reference device and functions to be performed by the other device.

Figure 3:
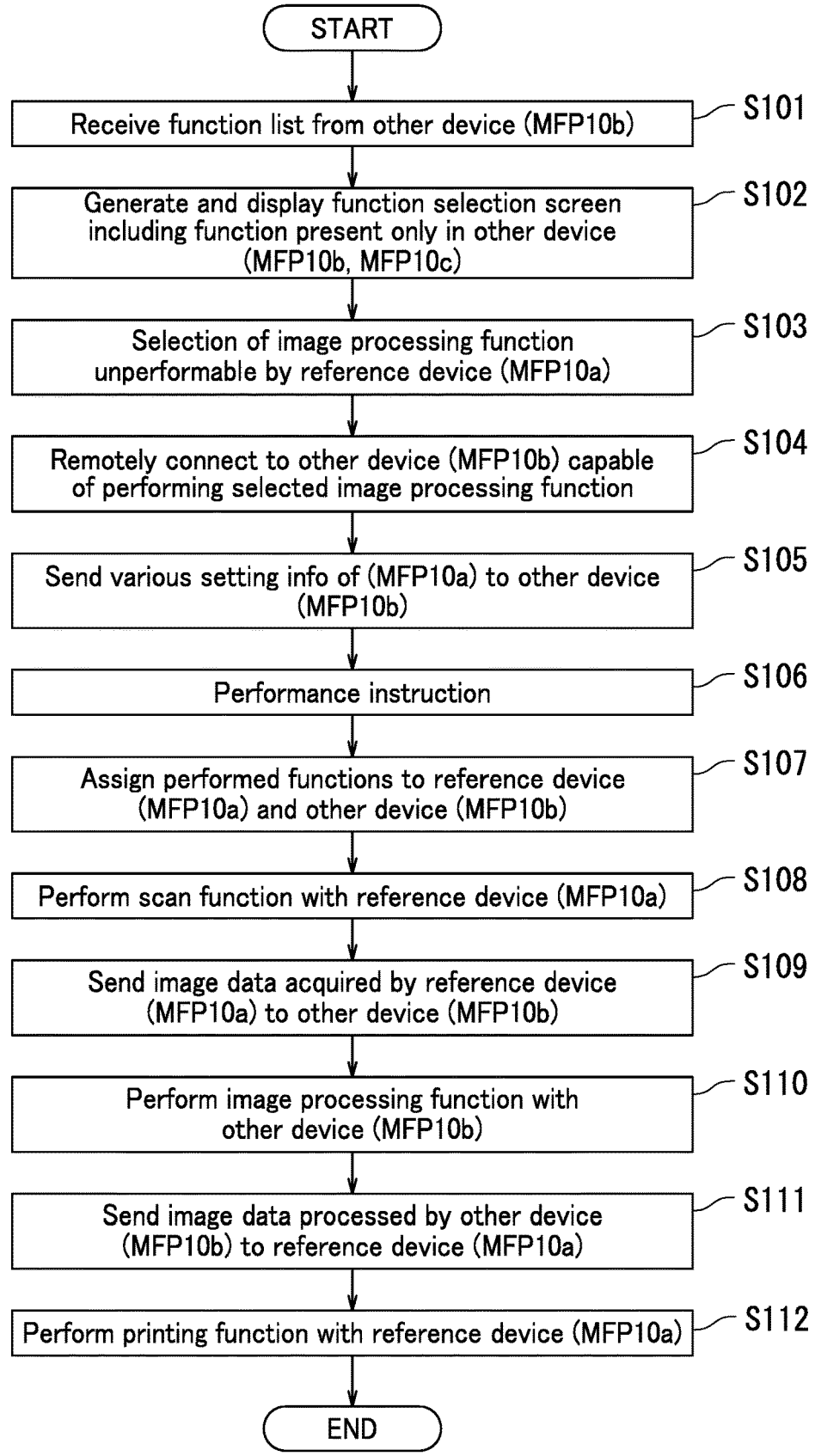
FIG. 3 is a sequence diagram which describes a remote connection operation of the image processing system according to the embodiment of the present disclosure.

Next, a remote connection operation is described in detail with reference to FIG. 3. In the remote connection operation, image processing on image data read by the document reading section 13 of the reference device (MFP10a) is performed by another device (MFP10b).

The controller 11 of MFP10a functions as a function collecting section 111. The function collecting section 111 of MFP10a sends a function list request to the other devices (MFP10b and MFP10c) connected to the network 50 and receives function lists as a response (Step S101).

Next, the controller 11 of MFP10a functions as a function selection screen generating section 112. The function selection screen generating section 112 of MFP10a generates a function selection screen including the functions of the reference device and functions present only in the other devices by comparing the function lists received from the other devices to the function list of the reference device and displays the generated function selection screen on the operation section 12 of MFP10a (Step S102).

In the function selection screen displayed by the operation section 12 of MFP10a, the controller 11 of MFP10a receives selection of an image processing function that is unperformable by MFP10a (Step S103). As a result, the controller 11 of MFP10a functions as a remote connection section 113 and remotely connects to MFP10b which is capable of performing the selected image processing function (Step S104). Due to the remote connection by the controller 11 of MFP10a, the display screen of the operation section 12 of MFP10b is displayed on the operation section 12 of MFP10a, and MFP10b becomes operable by the operation section 12 of MFP10a. For example, when the controller 11 of MFP10a has received selection of "searchable PDF" in the function selection screen illustrated in FIG. 2A, the operation section 12 of MFP10a is remotely connected to MFP10b which is capable of performing "searchable PDF".

Next, the remote connection section 113 of MFP10a sends various setting information of MFP10a to MFP10b (Step S105). Through the above, the various setting information of MFP10a such as resolution and document size is reflected by MFP10b.

Next, when performance is instructed through a start key or the like in the operation section 12 of MFP10a (Step S106), the controller 11 of MFP10b functions as a function assigning section 114.

In the performance of functions set through the reference device (MFP10a), the function assigning section 114 of MFP10b assigns functions to be performed by the reference device (MFP10a) and functions to be performed by another device (MFP10b) (Step S107). Among functions set through the reference device, the function assigning section 114 of MFP10b assigns functions that are performable only by the other device to the other device. Then, with regard to functions which are performable by either the reference device or the other device, the function assigning section 114 of MFP10b assigns attended functions which require the operator to be present for performance to the reference device and assigns unattended functions which may be performed without the operator present to whichever of the reference device or the other device that performs the function performed directly before the unattended function. Note that at least one of the scan function through which a document set by the operator is read by the document reading section 13 and the printing function through which the operator receives printed matter printed through image formation by the image forming section 16 correspond to attended functions, and other functions correspond to unattended functions.

The following describes a configuration in which the reference device is provided with the scan function, the image processing function, and the printing function, and the function assigning section 114 of the other device assigns the scan function and the printing function to the reference device (MFP10a), and assigns the image processing function to the other device (MFP10b).

First, the function assigning section 114 of MFP10b instructs the document reading section 13 of the reference device (MFP10a) to perform the scan function and notifies the reference device that a subsequent function is to be performed by the other device (MFP10b). Through the above, in the reference device (MFP10a), the document reading section 13 performs the scan function which acquires image data by reading the document set by the operator (Step S108) and instructs the communication section 17 of MFP10a to send the acquired image data to the other device. Then, the communication section 17 of MFP10a sends the image data acquired by the document reading section 13 to the other device (MFP10b) (Step S109). Note that instead of the document reading section 13 instructing the communication section 17 to send, the communication section 17 of MFP10a may acquire the image data acquired by the document reading section 13 and send the image data to the other device.

Next, the function assigning section 114 of MFP10b instructs the image processing section 15 of the other device (MFP10b) to perform the image processing function and notifies the image processing section 15 of MFP10b that the reference device (MFP10a) is to perform a subsequent function. Through the above, the image processing section 15 of the other device (MFP10b) performs the set image processing function on the acquired image data (Step S110). Then, the communication section 17 of the other device sends the image data which has undergone image processing to the reference device (MFP10a) (Step S111).

Next, the function assigning section 114 of MFP10b instructs the image forming section 16 of the reference device (MFP10a) to perform the printing function. Through the above, the image forming section 16 of the reference device (MFP10a) performs the printing function of printing through image formation based on the received image data (Step S112), and finishes the remote connection operation.

Note that when a sending function which is an unattended function has been set instead of the printing function which is an attended function, the sending function is assigned to the other device (MFP10b) which performs the image processing function performed directly before the sending function among the reference device and the other device. In this case, the other device (MFP10b) does not send the image data which has undergone the image processing in Step S111 to the reference device (MFP10a), but performs the sending process to send the image data which has undergone the image processing to a specified terminal device and finishes the remote connection operation.

Figure 4:
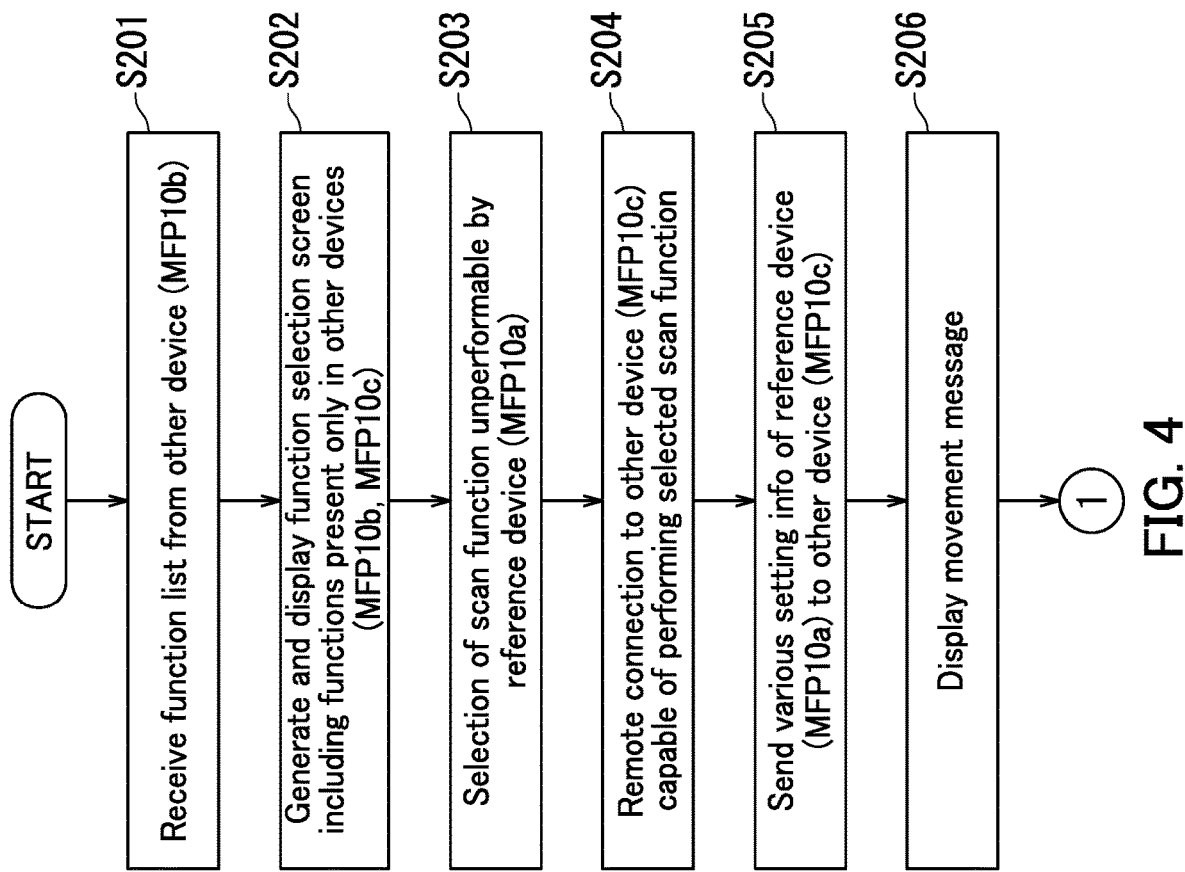
FIG. 4 is a sequence diagram which describes the first part of a setting transition operation of the image processing system according to the embodiment of the present disclosure.
Figure 5:
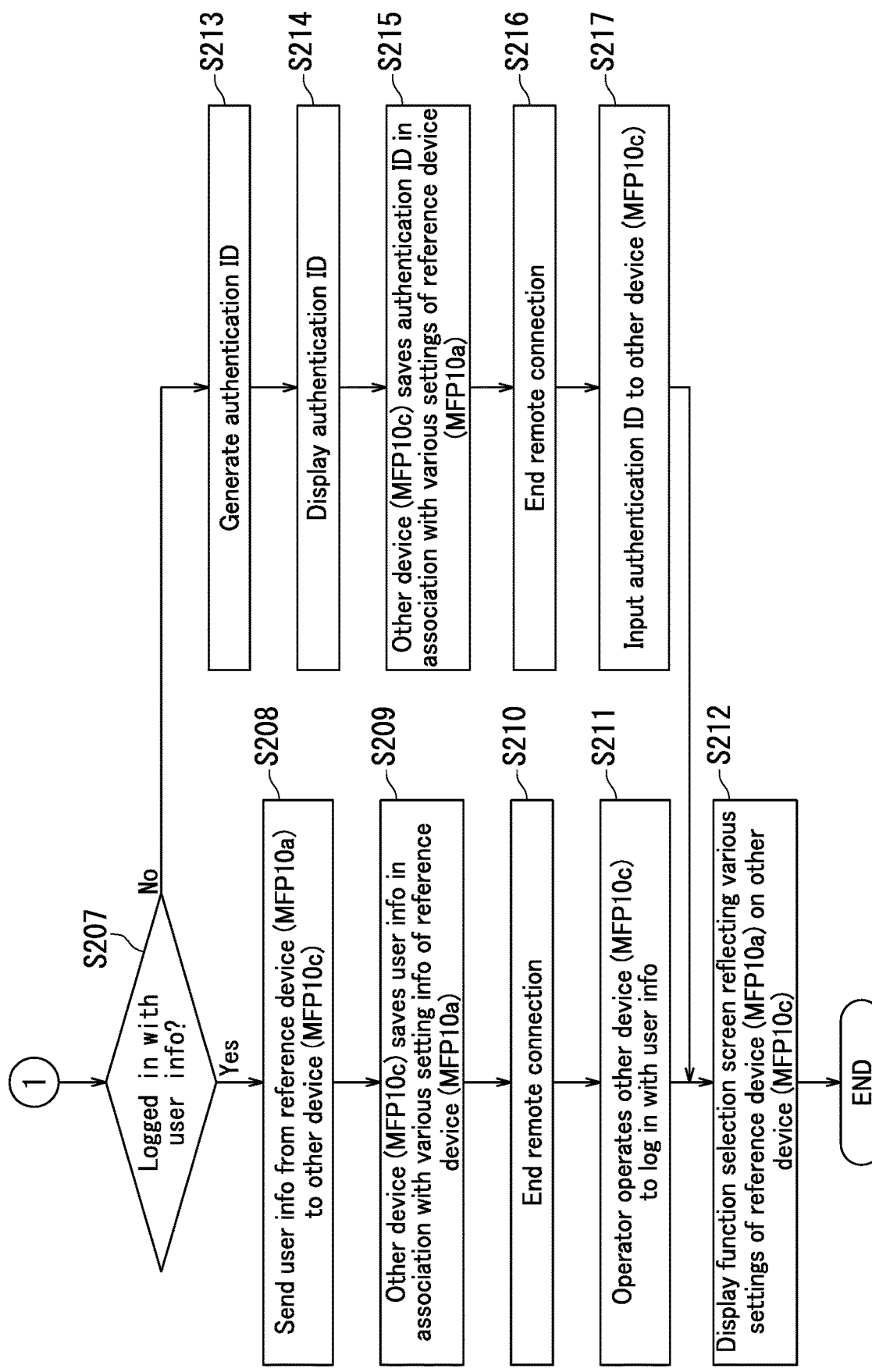
FIG. 5 is a sequence diagram which describes the second part of the setting transition operation of the image processing system according to the embodiment of the present disclosure.

Next, a setting transition operation performed when the scan function which is unperformable by the reference device (MFP10a) has been set is described in detail with reference to FIGS. 4 and 5.

The controller 11 of MFP10a functions as a function collecting section 111, sends a function list request to the other devices (MFP10b and MFP10c) connected to the network 50, and receives function lists from the other devices as a response (Step S201).

Next, the controller 11 of MFP10a functions as a function selection screen generating section 112, generates a function selection screen including the functions of the reference device and functions present only in the other devices by comparing the function lists received from the other devices to the function list of the reference device, and displays the generated function selection screen on the operation section 12 (Step S202).

In the function selection screen displayed by the operation section 12 of the reference device, MFP10a receives selection of a scan function which is unperformable by MFP10a (Step S203). Next, the controller 11 of the reference device functions as a remote connection section 113 and remotely connects to MFP10c which is capable of performing the selected scan function (Step S204). Through the remote connection by the remote connection section 113 of the reference device, the display screen of the operation section 12 of MFP10c is displayed by the operation section 12 of MFP10a and the operation section 12 of MFP10a becomes capable of operating MFP10c. For example, when the controller 11 of MFP10a has received selection of "tilt correction" which is performable only by another device in the function selection screen illustrated in FIG. 2B, the operation section 12 of MFP10a is remotely connected to MFP10c which is capable of performing "tilt correction".

Next, the remote connection section 113 of MFP10a sends various setting information of MFP10a to MFP10c (Step S205). Through the above, the various setting information of MFP10a such as resolution and document size is reflected by MFP10c.

Next, the controller 11 of MFP10c functions as a remote connection section 113 and displays a movement message on the operation section 12 of the reference device (MFP10a) to prompt the operator to move to the other device (MFP10c) (Step S206).

Then, the remote connection section 113 of MFP10c confirms whether or not the operator is logged in with user information when operating MFP10a which is the reference device (Step S207).

When it has been confirmed that the operator is logged into MFP10a with user information in Step S207, the remote connection section 113 of MFP10c requests the user information of the operator from MFP10a. Through the above, the user information of the operator is sent from MFP10a to MFP10c (Step S208).

Next, the remote connection section 113 of MFP10c saves the received user information in association with the various setting information of MFP10a in the storage 14 of MFP10c (Step S209), and ends the remote connection (Step S210).

Next, when the operator moves from MFP10a to MFP10c and operates MFP10c to log in with user information (Step S211), the remote connection section 113 of MFP10c generates a function selection screen reflecting the various setting information of MFP10a saved in association with the user information and displays the function selection screen on the operation section 12 (Step S212). Through the above, the operator can continue to use the settings of MFP10a without resetting MFP10c with the various settings of MFP10a.

When it has been confirmed that the operator is not logged in with user information in Step S207, the remote connection section 113 of MFP10c generates an authentication ID (Step S213) and displays the generated authentication ID on the operation section 12 of the reference device (MFP10a) (Step S214). The operator confirms the authentication ID displayed on the operation section 12 of the reference device.

Next, the remote connection section 113 of MFP10c saves the generated authentication ID in association with the various setting information of MFP10a in the storage 14 of MFP10c (Step S215), and ends the remote connection (Step S216).

Next, when the operator moves from MFP10a to MFP10c and operates MFP10c to input the displayed authentication ID into the operation section 12 (Step S217), the process moves to Step S212 and the remote connection section 113 of MFP10c generates a function selection screen reflecting the various setting information of MFP10a saved in association with the authentication ID and displays the function selection screen on the operation section 12 of MFP10c. Through the above, the operator can continue to use the settings of MFP10a without resetting MFP10c to the settings of MFP10a.

The image processing system according to the present embodiment as described above includes an image processing device 10 which is a reference device (MFP10a) operated by an operator and image processing devices 10 which are other devices (MFP10b and MFP10c) with functions not present in MFP10a. The reference device and the other devices are connected through a network 50. MFP10a includes an operation section 12, a function collecting section 111, a function selection screen generating section 112, and a remote connection section 113. The operation section 12 functions as a display section and an input section. The function collecting section 111 sends a function list request to MFP10b and MFP10c connected to the network 50 and receives function lists from MFP10b and MFP10c as a response. The function selection screen generating section 112 generates a function selection screen including the functions of MFP10a and the functions present only in MFP10b and MFP10c by comparing the function list received from MFP10b and MFP10c to the function list of MFP10a and displays the function selection screen on the operation section 12. When a function present only in MFP10b is selected in the function selection screen, the remote connection section 113 remotely connects MFP10b in which the selected function is present to the operation section 12 of MFP10a.

Through this configuration, functions not present in the reference device can be simply performed through another device (MFP10b) using the operation section 12 of the reference device (MFP10a) operated by the operator. Specifically, in a state where both low-function devices and high-function devices are connected to the same network, when a function present only in a high-function device is selected using the operation section 12 of a low-function device, the high-function device with the selected function is remotely connected to the operation section 12 of the low-function device. Accordingly, processing which cannot be performed by the low-function device can be simply performed through the high-function device.

In addition, according to the present embodiment, MFP10b includes a function assigning section 114. In the performance of set functions during the remote connection, the function assigning section 114 assigns functions to be performed by MFP10a and functions to be performed by MFP10b. The function assigning section 114 assigns functions performable only by MFP10b to MFP10b. With regard to functions performable by either MFP10a or MFP10b, the function assigning section 114 assigns attended functions which require the operator to be present for performance to MFP10a and assigns unattended functions which may be performed without the operator present to whichever of MFP10a or MFP10b that performs the function performed directly before the unattended function. The attended functions include at least one of a scan function through which a document set by the operator is read by a document reading section 13 and a printing function through which the operator receives printed matter printed through image formation by an image forming section 16.

Through this configuration, set functions can be effectively performed.

Furthermore, according to the present embodiment, the remote connection section 113 of MFP10a sends the various setting information of MFP10a to the remotely connected MFP10b and causes MFP10b to reflect the various setting information.

Through this configuration, convenience for a user can be increased because it is not necessary to repeat selection and setting of a function.

Another image processing system according to the present embodiment includes an image processing device 10 which is a reference device (MFP10a) operated by an operator and image processing devices 10 which are other devices (MFP10b and MFP10c) with functions not present in the reference device (MFP10a). The reference device (MFP10a) and the other devices (MFP10b and MFP10c) are connected through a network 50. MFP10a includes an operation section 12, a function collecting section 111, a function selection screen generating section 112, and a reference device remote connection section (remote connection section 113). The operation section 12 functions as a display section and an input section. The function collecting section 111 sends a function list request to MFP10b and MFP10c connected to the network 50 and receives function lists from MFP10b and MFP10c as a response. The function selection screen generating section 112 generates a function selection screen including functions of MFP10a and functions present only in MFP10b and MFP10c by comparing the function lists received from MFP10b and MFP10c to the function list of MFP10a and displays the function selection screen on the operation section 12. When a function which requires the operator to operate MFP10c is selected in the function selection screen, the reference device remote connection section sends various setting information of MFP10a to MFP10c in which the selected function is present and remotely connects MFP10c to the operation section of MFP10a. MFP10c includes an other device remote connection section (remote connection section 113). The other device remote connection section displays a movement message prompting operator movement to MFP10c on the operation section 12 of MFP10a and ends the remote connection after the received various setting information of MFP10a has been saved in storage 14 of MFP10c.

Through this configuration, the operator can continue to use the settings of MFP10a on MFP10c without resetting MFP10c to the same settings as MFP10a.

In addition, according to the present embodiment, when the operator is logged into MFP10a with user information, the remote connection section 113 of MFP10a sends the user information of the operator to MFP10c in which the selected function is present. When the operator is logged into MFP10a with user information, the remote connection section 113 of MFP10c saves the received user information in association with the various setting information of MFP10a in the storage 14 of MFP10c. The remote connection section 113 of MFP10c generates an authentication ID, displays the generated authentication ID on the operation section 12 of MFP10a, and saves the generated authentication ID in association with the various setting information of MFP10a in the storage 14 of MFP10c.

Through this configuration, the settings of MFP10a can continue to be used upon the operator being authenticated by logging in with user information or inputting the authentication ID.

Note that the present disclosure is not limited to the above embodiments, and it is clear that the embodiment may be appropriately altered within a scope of the technical idea of the present disclosure. Furthermore, aspects of the above elements of configuration, such as number, position, and shape, are not limited to the above embodiment. Any number, position, shape, or the like may be used to implement the present disclosure. Elements of configuration which are the same are labeled with the same reference signs in the drawings.

What is claimed is:

1. An image processing system comprising:
    an image processing device which is a reference device operated by an operator; and
    an image processing device which is another device with a function not present in the reference device, wherein
    the reference device and the other device are connected through a network,
    the reference device includes:
        an operation section which functions as a display section and an input section;
        a function collecting section which sends a function list request to the other device connected to the network and receives a function list from the other device as a response;
        a function selection screen generating section which generates a function selection screen including a function of the reference device and the function present only in the other device by comparing the function list received from the other device to a function list of the reference device and displays the function selection screen on the operation section; and
        a remote connection section which, when the function present only in the other device is selected in the function selection screen, remotely connects the other device in which the selected function is present to the operation section of the reference device,
    the other device includes a function assigning section which, in performance of set functions during remote connection, assigns a function to be performed by the reference device and a function to be performed by the other device, and
    the function assigning section
        assigns a function performable by only the other device to the other device, and
        with regard to functions performable by either the reference device or the other device, assigns an attended function which requires the operator to be present for performance to the reference device and assigns an unattended function which may be performed without the operator present to whichever of the reference device or the other device that performs a function performed directly before the unattended function.

2. The image processing system according to claim 1, wherein
    the attended function includes a scan function through which a document set by the operator is read by a document reading section.

3. The image processing system according to claim 1, wherein
    the attended function includes a printing function through which the operator receives printed matter printed through image formation by an image forming section which prints through image formation.

4. The image processing system according to claim 1, wherein
    the remote connection section of the reference device sends various setting information of the reference device to the remotely connected other device and causes the other device to reflect the various setting information.

* * * * *